Dec. 12, 1950     W. A. HYLAND     2,533,374

DIRT GUARD FOR GRAIN DRILLS

Filed March 25, 1946

*INVENTOR*
WILLIAM A. HYLAND
BY
*ATTORNEYS*

Patented Dec. 12, 1950

2,533,374

UNITED STATES PATENT OFFICE 2,533,374

DIRT GUARD FOR GRAIN DRILLS

William A. Hyland, Horicon, Wis., assignor to John Deere Van Brunt Company, a corporation of Wisconsin Application March 25, 1946, Serial No. 656,947

9 Claims. (Cl. 111—85)

The present invention relates generally to agricultural implements and more particularly to planting machines, such as grain drills and the like.

The object and general nature of the present invention is the provision of a new and improved seed boot construction for grain drills and the like in which the lower end of each seed boot is protected by a flexible flap or dirt guard gate which is exceedingly simple and inexpensive but very effective to prevent dirt from plugging or clogging the lower seed discharge end of the seed boot in the event the drill should be backed inadvertently or otherwise.

These and other objects and advantages of the present invention will be apparent to those skilled in the art after a consideration of the following detailed description, taken in conjunction with the accompanying drawings in which the preferred forms of the invention have been shown by way of illustration.

Figures 1, 2:
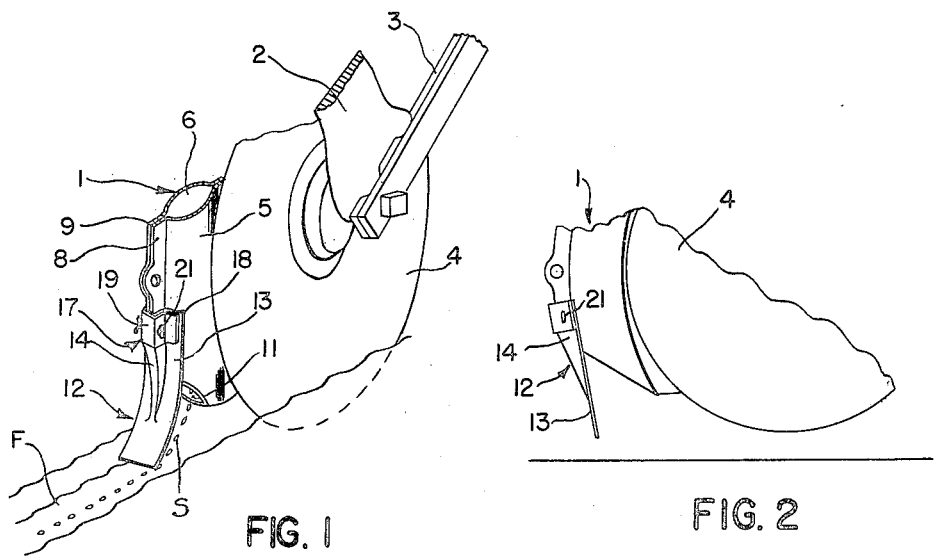
Figure 1 is a perspective view showing the seed boot of a grain drill as equipped with a dirt guard gate constructed according to the principles of the present invention.
Figure 2 is a partial side view of the construction shown in Figure 1, with the furrow opener and seed boot raised out of contact with the ground.

Referring first to Figure 1, the reference numeral 1 indicates one of the seed boots of a grain drill or similar implement, each seed boot including a bracket section 2 by which the boot and associated parts are connected to a drag bar 3 and on which is mounted a single disk opener 4. According to one form of the present invention the seed boot 1 is of sheet metal construction, including right and left stampings 5 and 6 connected together along front and rear edges, the rear edges, indicated at 8 and 9, being in the form of flanges suitably connected, as by rivets, and forming a rib along the rear side of the seed boot 1. The lower ends of the seed boot sections 5 and 6 are so formed as to provide a downwardly and rearwardly facing seed discharge opening 11 through which seeds S are delivered for deposit into a furrow F formed in the ground by the furrow opener 4.

Figures 3, 4:
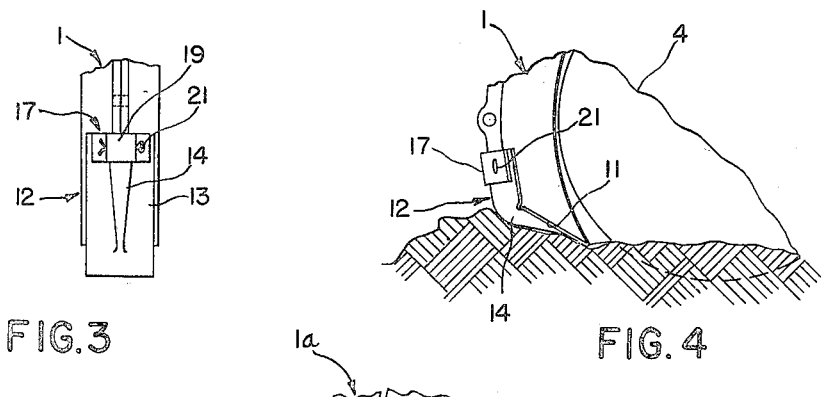
Figure 3 is a rear view looking forwardly of my improved dirt guard gate.
Figure 4 is a side view, similar to Figure 2, showing the action of the gate in preventing the plugging or clogging of the lower end of the seed tube if perchance the drill or implement should be backed while the furrow openers are in contact with the ground.

If the seed discharge opening 11 were left exposed, backing of the drill, which sometimes occurs inadvertently, may cause dirt to be forced up into the opening 11 plugging the opening and preventing subsequent deposit of seed when the drill is started up again. In order to prevent this plugging or clogging, I provide a dirt guard gate 12 in the form of a strip of flexible or elastic material 13, which may be of rubber or rubber-like material, such as tire casing stock. Preferably, the strip 13 is flat but, when applied to the rear side of the seed boot 1 around the rib formed by the flanges 8 and 9, a rearwardly facing fold or rib 14 is formed in the strip 13. This serves the purpose of imparting a certain amount of rigidity to the flap or strip 12, and in order to fix the flap or strip 12 to the seed boot 1, I provide a generally U-shaped clip 17 having curved arm sections 18 and a central section 19 which fits snugly against the rear side of the seed boot 1, with the upper end of the flap or strip 12 held thereby snugly against the rear side of the seed boot. In order to hold the parts in assembled relation, a central portion 19 is apertured to receive a cotter pin 21 which is extended through both sides of the clip and through the rib 8, 9, as well as the intervening layer or layers of the strip or flap 12, as best shown in Figure 3.

In operation, the lower end of the flap 12 rides along the edges of the furrow F opened by the disk opener 4, but the lower edge of the flap 12 is held by the walls of the furrow upwardly out of contact with the seed deposited therein, so that the flap does not interfere with the proper seeding, as is illustrated in Figure 1. If perchance the drill should be backed, the lower end of the flap 12 closes against the opening 11, effectively preventing any dirt from being forced up into the opening. Since the flap or strip 12 is flexible and elastic, there is very little tendency for any dirt forward of the strip 12, at the moment the drill is backed, to be forced into the opening 11 by the closing of the flap 12 against the opening 11. When the seed boot and furrow opener 4 are raised into a transport position the flap or strip 12 hangs downwardly in the manner shown in Figure 2.

Figure 5:
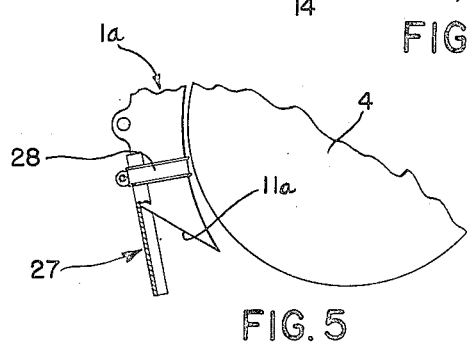
Figure 5 is a side view of modified form of the present invention.

A modified form of the present invention is shown in Figure 5. In this form of the invention the seed tube 1a is generally tubular and has no rear rib or flange, the same being of cast construction. For use with a seed boot of this type I provide a generally flat rectangular piece or strip of rubber or rubber-like material 27 having its upper end bent about the rear side of the seed tube 1a and held thereagainst by a clamp 28. Since the rear portion of the seed tube 1a is generally curved, the normal position of the flap 27 is curved, as shown in Figure 5. This curvature of the flap 27 imparts some rigidity to the piece so that its normal position is as shown in Figure 5. When the furrow opener 4 and seed tube 1a are lowered into operating position, the contact between the lower end of the flap 27 and the ground causes the same to be deflected rearwardly, in much the same manner as is illustrated in Figure 1. If, on the other hand the drill should be backed, the lower end of the flap 27 closes against the seed opening 11a, closing the same off so that no dirt or the like can be forced into it.

In both forms of the invention, there is no tendency for soil to adhere to and/or build up on the forward face of the flap, for the reason that the latter being of flexible resilient material is constantly flexed and bent in operation, such flexing serving to loosen any soil that might otherwise adhere to the gate.

While I have shown and described above the preferred construction in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with a seed boot having a rear rib and a generally rearwardly facing discharge opening, of a dirt guard gate comprising a strip of flexible material folded about said rib and extending downwardly in rear of said opening, and means embracing said rib and strip for holding the latter in position on said seed boot.

2. The combination with a generally downwardly extending generally tubular seed boot having a generally rearwardly and downwardly facing seed discharge opening in the lower end of said boot, of a dirt guard gate comprising a strip of flexible material fitted around the rear portion of said tubular seed boot and hanging over said seed opening, and means for holding the upper part of said strip to said seed boot so that normally the strip retains a curvature corresponding generally to the shape of the portion of the seed tube to which said strip is held.

3. A dirt guard gate for seed boots and the like having a discharge opening, comprising a strip of flexible material, means for forming and retaining a generally centrally disposed vertical rib in said strip to render the strip more resistant to flexing, and means for clamping the upper end of said strip to said boot above the opening therein.

4. A dirt guard gate for seed boots and the like having a discharge opening, comprising a strip of flexible material, a rigid clip at least partially encircling said seed boot adjacent said opening and serving to hold the upper end of said strip to said boot above the opening therein, and means for connecting said clip to said boot with the upper end of said strip therebetween.

5. A dirt guard gate for a generally downwardly extending generally tubular seed boot having a generally rearwardly and downwardly facing seed discharge opening in the lower end of said boot, comprising a normally flat piece of flexible material adapted to be bent about the lower rear portion of said seed boot, and means for clamping the upper end of said strip to the seed boot above said seed opening.

6. A dirt guard gate for seed boots and the like having a discharge opening adapted to be covered by said gate, comprising a strip of flexible material, a rigid clip adapted to at least partially encircle said seed boot adjacent said opening with the upper end of said strip between said clip and said boot, and means extending through both said clip and said strip for holding them in position on said boot.

7. In a planter or the like having a boot with a generally downwardly facing opening, a dirt guard gate for said boot comprising a deformable member formed of flexible material, and means fixing the upper end of said deformable member substantially immovably to said boot above said opening with the lower portion of said deformable member hanging downwardly generally over said opening in depending relation, said means being shaped so that said member normally is curved generally about a substantially vertically extending axis, so that said member is capable of opposing deflection of the lower portion of said member, as in normal planting operation, out of said depending position and a tendency, when deflected out of said depending position by a superior force, to return to said position, whereby the lower portion of said member will be in readiness to move against and close the opening in said boot in the event the latter should be forced backwardly in the soil.

8. For use with a generally downwardly extending seed boot having a generally rearwardly and downwardly facing seed discharge opening in the lower end of said boot, the improvement comprising a dirt guard including a strip of flexible material adapted to be fitted around the rear portion of said seed boot and disposed over said seed opening, and means for holding the upper part of said strip to said seed boot, said means comprising a relatively rigid member having a non-planar strip-engaging and confining portion shaped to impart to the strip a generally vertically extending fold-like configuration so that normally the strip yieldably opposes deformation in a generally fore and aft extending direction, thereby normally retaining its shape and disposing its lower portion in a position in readiness to move against and close the discharge opening in said boot, in the event the latter should be forced backwardly in the soil.

9. In a planter or the like having a boot with a generally downwardly facing opening, a dirt guard gate for said boot comprising a deformable member formed of flexible material, and means fixing the upper end of said deformable member substantially immovably to said boot above said opening with the lower portion of said deformable member extending downwardly over said opening to a point generally below said opening, said gate having sufficient flexibility to be deflected rearwardly away from said opening by the pressure of soil thereagainst during forward movement of the planter and to be deflected forwardly toward said opening so as to substantially close the latter if the planter should be moved rearwardly through the soil.

WILLIAM A. HYLAND.

(References on following page)

REFERENCES CITED

The following references are of record in the file of this patent:

UNITED STATES PATENTS

| Number | Name | Date |
|---|---|---|
| 308,585 | Watts | Nov. 25, 1884 |
| 611,980 | Smith | Oct. 4, 1898 |
| 789,798 | Deterding | May 16, 1905 |
| 853,256 | Monson | May 14, 1907 |
| 909,137 | Bellerive | Jan. 12, 1909 |

FOREIGN PATENTS

| Number | Country | Date |
|---|---|---|
| 103,830 | Australia | Apr. 27, 1938 |